US009435050B2

(12) United States Patent
Li et al.

(10) Patent No.: US 9,435,050 B2
(45) Date of Patent: Sep. 6, 2016

(54) METHOD OF MAKING A POROUS TIO2 PHOTONIC FILM

(75) Inventors: Yang Yang Li, Hong Kong (CN); Jianwen Cheng, Hong Kong (CN); Chun Kwan Tsang, Hong Kong (CN); Zhengtao Xu, Hong Kong (CN)

(73) Assignee: CITY UNIVERSITY OF HONG KONG, Kowloon Tong, Kowloon (HK)

( * ) Notice: Subject to any disclaimer, the term of this patent is extended or adjusted under 35 U.S.C. 154(b) by 1500 days.

(21) Appl. No.: 12/715,789

(22) Filed: Mar. 2, 2010

(65) Prior Publication Data
US 2011/0214998 A1 Sep. 8, 2011

(51) Int. Cl.
C25D 11/26 (2006.01)
C25D 11/02 (2006.01)
C25F 3/08 (2006.01)
C25F 3/26 (2006.01)

(52) U.S. Cl.
CPC ............ C25D 11/26 (2013.01); C25D 11/024 (2013.01); C25F 3/08 (2013.01); C25F 3/26 (2013.01)

(58) Field of Classification Search
CPC ............................. C25D 11/26; C25D 11/024
USPC ........................................................ 205/322
See application file for complete search history.

(56) References Cited

U.S. PATENT DOCUMENTS 4,251,330 A * 2/1981 Sheasby et al. ............... 205/173
4,879,007 A * 11/1989 Wong ............................. 205/137
5,160,599 A * 11/1992 Kobayashi ............. C25D 11/26 205/106
2007/0289874 A1* 12/2007 Masuda et al. ................ 205/171
2008/0029399 A1* 2/2008 Tomita et al. ................. 205/112
2008/0274375 A1* 11/2008 Ng et al. ........................ 428/687

FOREIGN PATENT DOCUMENTS

WO WO 2007120176 A2 * 10/2007

OTHER PUBLICATIONS

Chu et al., "Highly Porous (TiO2—SiO2—TeO2)/Al2O3/TiO2 Composite Nanostructures on Glass with Enhanced Photocatalysis Fabricated by Anodization and Sol-Gel Process" J. Phys. Chem. B 107, pp. 6586-6589 (2003).*
Misra et al., "Growth of Carbon Nanotubes on Nanoporous Titania Templates" J. Nanosci. Nanotechnol. 7(8), pp. 2640-2646 (2007).*
Chanmanee et al., "Titania Nanotubes from Pulse Anodization of Titanium Foils" Electrochem. Comm. 9, pp. 2145-2149 (2007).*
"Coloring Titanium and Related Metals by Electrochemical Oxidation" by Emily Gaul J. Chem. Ed. 70(3), p. 176-178 (Mar. 1993).*
Tian et al., "Study on Titania Nanotube Arrays Prepared by Titanium Anodization in NH4F/H2SO4 Solution" J. Mater. Sci. 42, pp. 5539-5543 (2007).*

* cited by examiner

Primary Examiner — Bryan D. Ripa
(74) Attorney, Agent, or Firm — Leydig, Voit & Mayer, Ltd.

(57) ABSTRACT

A porous titanium dioxide film having photonic properties is made by etching a titanium substrate in an electrolyte solution in the presence of an electric field. The electrolyte solution can be an organic electrolyte solution. Etching involves providing an electrolyte solution in contact with a pair of electrodes and passing an electric current through the electrolyte solution. The titanium substrate can be one of the pair of electrodes. The current has a wave profile selected from a group consisting of a periodic square profile, a sine wave, a linear profile, or a quintic profile, and is provided either parallel to or perpendicular to a plane of the substrate.

17 Claims, 10 Drawing Sheets

METHOD OF MAKING A POROUS TIO2 PHOTONIC FILM

BACKGROUND TO THE INVENTION

1. Field of the Invention

The current invention relates to methods of making foraminous, or porous, structures, and in particular to methods of making a multilayer porous films for use in photonic applications.

2. Background Information

TiO2 nanostructures are of great interest due to their versatile applications in dye-sensitized solar cells, photocatalysis, electrochromic effects and self-cleaning ability. To date, TiO2 nanostructures have been fabricated by various methods such as sputtering, evaporation deposition, electrodeposition, sol-gel process, and anodic oxidation. Among them, anodic oxidation proves to be a particularly effective method to generate self-organized nanotube arrays, whose tailorable porous morphology and high surface area are especially attractive for the applications as sensors, catalysts and dye-sensitized solar cell materials. Besides Ti, anodic oxidation has been applied to other metals (Al, Ta, Zr, Nb, Hf, and Fe) to conveniently synthesize metal oxide-based porous nanotube arrays.

Hitherto porous TiO2 photonic films are generally fabricated by lithographic methods or templating methods. Lithographic methods provide precision but are generally complicated and labor-intensive. The templating method is more convenient, which involves filling the voids of the self-assembled nanobead array with TiO2 and subsequent removal of the nanobead array, but it is more prone to structural defects. Comparing to the porous TiO2 photonic films, non-porous TiO2 photonic films have been more conveniently fabricated by electroplating or thermal oxidization, where a dense layer of TiO2 is either electroplated on a metal surface or generated on the surface of a titanium substrate by thermally oxidizing. The photonic response of these fabricated non-porous TiO2 films originates from the interference between the reflections of light from the surfaces of the film, or Fabry-Pérot interference. Thus, the color of these Fabry-Pérot TiO2 films can be adjusted by tuning the film thickness, which is relatively easy for the electroplating method but usually difficult for the thermal oxidization method. In general, dense TiO2 photonic films are not suitable for the applications as sensors, catalysts and dye-sensitized solar cell materials due to its non-porous feature and low surface area.

SUMMARY OF THE INVENTION

According to the invention there is provided a porous photonic TiO2 film fabricated by anodic oxidation. By adjusting the parameters of the anodic oxidation method, TiO2 films with different photonic colors can be obtained. The optical response of the TiO2 film changes when the porous film is exposed to ethanol vapor. This work provides a new method to tailor the photonic response of the porous TiO2 films, which is potentially useful to improve their various applications as sensors, optical coatings, smart filters, and photocatalysts.

According to a specific aspect of the invention there is provided a method of making a porous titanium dioxide film having photonic properties comprising etching a titanium substrate in an electrolyte solution in the presence of an electric field. The electrolyte solution is an organic electrolyte solution. Etching involves providing an electrolyte solution in contact with a pair of electrodes and passing an electric current through the electrolyte solution. The titanium substrate can be one of the pair of electrodes. The current has a wave profile selected from a group consisting of a periodic square profile, a sine wave, a linear profile, or a quintic profile, and is provided either parallel of perpendicular to a plane of the substrate.

Further aspects of the invention will become apparent from the following description, which is given by way of example only.

BRIEF DESCRIPTION OF THE DRAWINGS

The embodiments of the invention will now be described by a way of example and with reference to the following figures.

FIG. 6 is an SEM image of the bottom of the green TiO2 film, FIG. 7 are images of the photonic TiO2 films anodized by (a) a constant voltage for 600 second, (b) 900 seconds, (c) 1200 second, (d) a ramped voltage profile, (e) a pulsed voltage waveform with 6 cycles and (f) a constant current for 600 second.

DETAILED DESCRIPTION OF THE INVENTION

The flowing description is given by way of example only to illustrate the invention and is not intended to limit the scope of use or functionality of the invention. The invention is illustrated as practiced in making a photonic film, however, those skilled in the art will understand that a foraminous structure made according to the invention may have a variety of uses.

In the following discussion mesoporous refers to a material having foramen, or mesopores, size ranging from 2 to 50 nm. Microporous materials have pore diameters of less than 2 nm and macroporous materials have pore diameters of greater than 50 nm. In its preferred embodiment the current invention provide a mesoporous film. However, this is not essential to the invention and embodiments of the invention may be mesoporous or macroporous. A film according to the invention is also multilayer in that it comprises at least a first dense layer of TiO2 and a second layer of porous TiO2.

Figure 1:
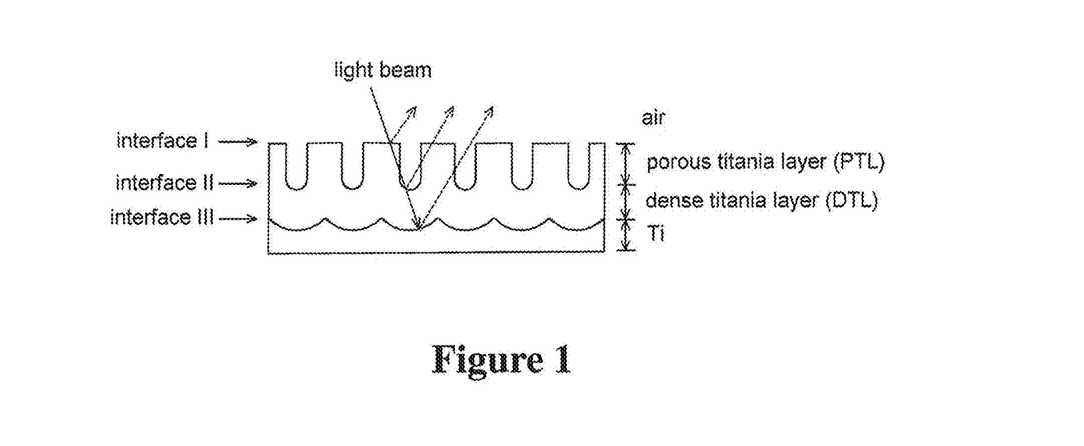
FIG. 1 is a schematic illustration of an exemplary embodiment of a multilayer porous TiO2 film according to the invention.

A preferred embodiment of a multilayer mesoporous, titanium dioxide (TiO2) film according to the invention is shown in FIG. 1. The film comprises a substrate of Titanium (Ti) with which is formed a first layer of dense titanium dioxide (DTL) and a second layer of mesoporous titanium dioxide (PTL) on top of the dense titanium dioxide layer. The mesoporous titanium dioxide comprises foramen, or pores, size ranging from 2 to 50 nm. The titanium dioxide layers are formed in a titanium substrate using an electrochemical etching technique such as anodic oxidation. At the first stage of the anodization process, a dense layer of TiO2 formed in the surface of the Titanium substrate. Random shallow pore structures are then formed into the dense TiO2 layer. As the anodization process continues the frontiers of both the dense TiO2 layer and the pore structures are pushed deeper into the Titanium substrate.

Figure 2:
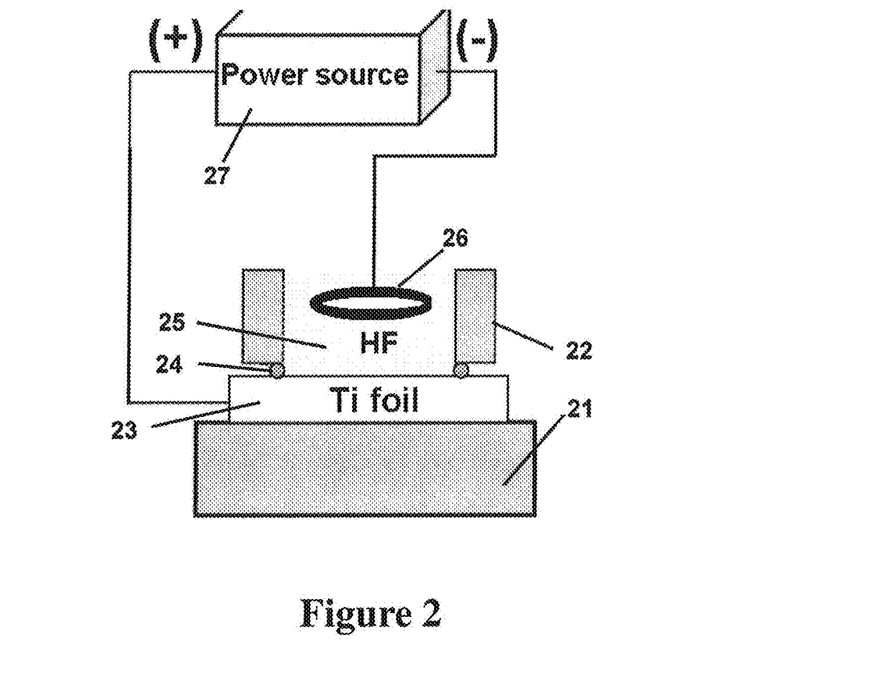
FIG. 2 is a section schematic illustration of an apparatus for making a TiO2 film according to the invention.
Figure 3:
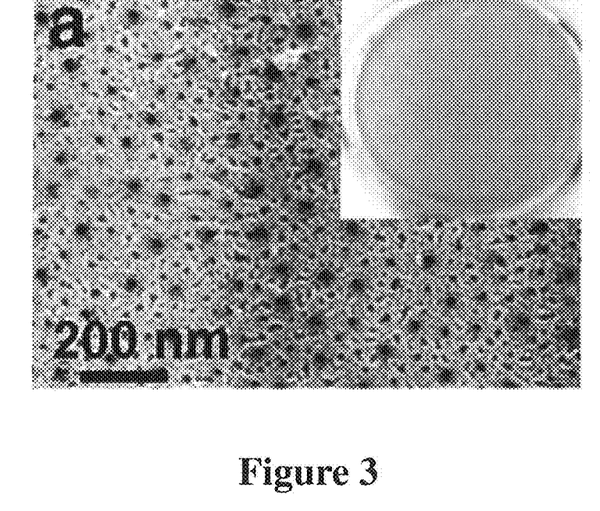
FIG. 3 is an SEM image of the top of a purple TiO2 film—the inset is the optical photograph of the TiO2 film on the Ti foil substrate.

FIG. 2 is a section schematic diagram of electrochemical etching setup used to make a mesoporous TiO2 film of FIG. 1. The cell comprises a Teflon coated base 21 and a Teflon coated circular wall 22. The film is etched from a titanium foil 23 which is placed on the base with the circular wall 22 arranged on top of the foil 23. An O-ring 24 is used to seal the circular wall 22 over the foil 23 forming a reservoir 25 into which etching solution is located. A circular electrode 26 is located in the etching solution and is connected to the negative terminal of a power source 27. The positive terminal of the power source is connected with the titanium foil 23 which forms the other electrode.

In an exemplary embodiment of the invention the multilayer mesoporous TiO2 film is made by the anodic oxidation of a titanium foil in an organic electrolyte. In the preferred embodiment the titanium foil is 0.25 mm thick, 99.7% purity (purchased from Sigma-Aldrich) and is pressed together with an aluminum foil against an O-ring leaving 1.2 cm2 exposed to the electrolyte. A two electrode method is used with the other electrode being a platinum ring. The titanium foil and platinum ring are placed in an electrochemical cell containing the organic electrolyte.

In the preferred embodiment the electrolyte comprises an organic solution of ethylene glycol (International Laboratory USA, containing less than 0.5 wt % H2O), 0.21 mole of hydrofluoric acid (HF) (48%, Riedel-de Haën) and 0.12 mole of hydrogen peroxide (H2O2) (30%, Riedel-de Haën). The electrolyte is "aged" for 12 h at 60 V before use. Aging has been shown to improve the anodization process and is preferable, but not strictly necessary for the invention. The both aqueous and organic electrolyte solution can be used to etch titanium, although organic one is more common.

Anodization is carried out by applying a voltage or current profile generated by a computer controlled power source, such as a Keithley 2400 Sourcemeter. The profile may be a ramp, constant voltage, square or sine wave, but in the preferred embodiment is a sinuous voltage waveform varying between 50 V and 100 V with a periodicity of 60 s. To obtain a desired film color, the number of periods of the voltage sine wave is adjusted to generate the proper film thickness, e.g., 7 periods for a purple film and 20 periods for a green film.

Besides the sinuous voltage waveform, anodization can also be carried out using other voltage or current profiles including a constant voltage (typically, 75 V), a voltage that is linearly ramped up and then kept at a constant value (typically, from 50 V to 100 V at 0.5 V/sec and then kept at 100 V for 500 sec), a pulsed voltage profile (typically, 100 V for 95 sec and −20 V for 5 sec per cycle), or a constant current (typically, 3 mA). Similarly, the duration of the voltage/current profile is adjusted to target different color, e.g., 3 mA for 600 sec to obtain a red sample.

Scanning electron microscopy (SEM) study was done with an accelerating voltage of 10 kV on a FEI XL-30 machine. Reflectivity spectra were obtained with normal incidence of light using an Ocean Optics USB 2000+ charge-coupled-device spectrometer fitted to an optical microscope, using a clean Ti foil as the standard for reference. Optical photographs of the scanning electron microscopy images are shown in FIGS. 3 through 6.

Figure 4:
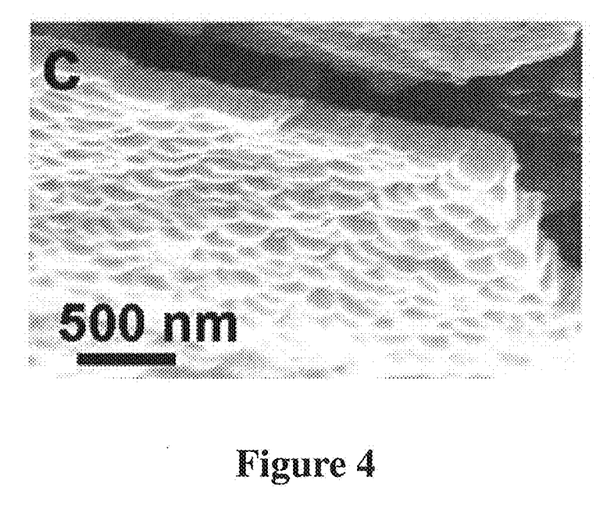
FIG. 4 is an SEM image of the bottom of the purple TiO2 film.
Figure 5:
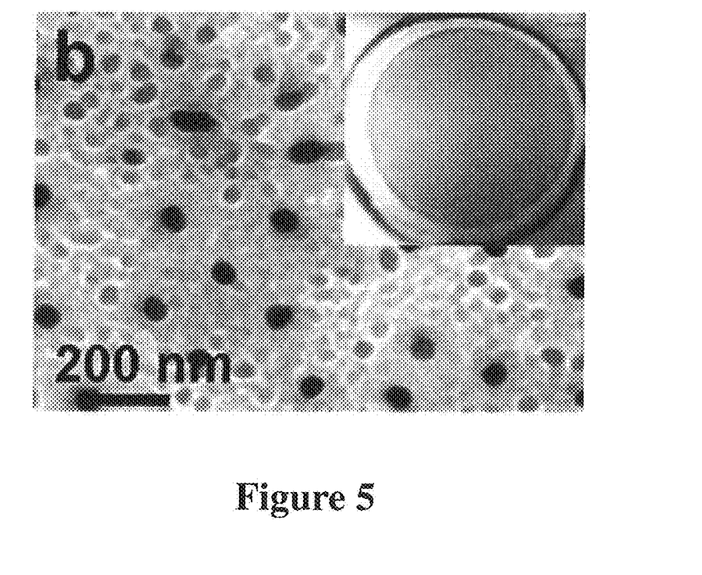
FIG. 5 is an SEM image of the top of a green TiO2 film—the inset is the optical photograph of the TiO2 film on the Ti foil substrate.
Figure 6:
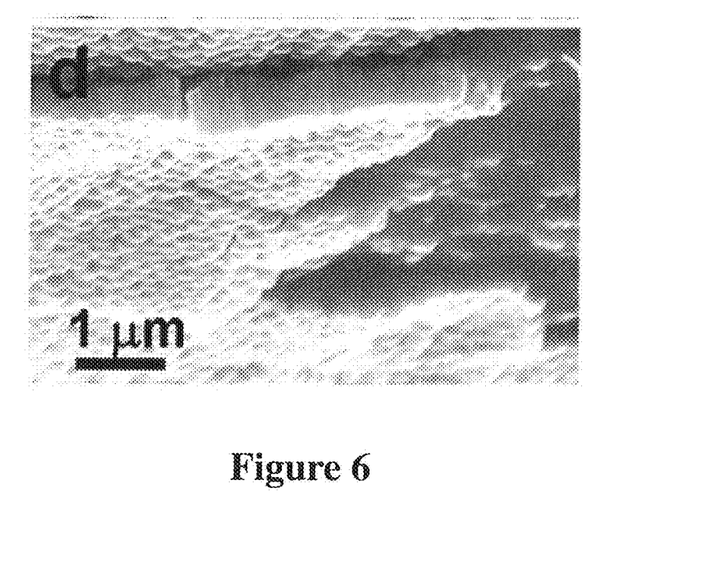

Referring to FIGS. 3-6, the overall thickness of these photonic TiO2 films is on the scale of a few hundred nanometers, e.g., 200 nm and 400 nm for the purple film and green film shown respectively in FIGS. 4 and 6. The top view of the TiO2 films shows that the inner diameter of nanotubes is on the scale of a few tens of nanometers and increases with the film thickness, e.g., around 30 nm for the 200 nm thick purple film and around 60 nm for the 400 nm thick green film shown respectively in FIGS. 3 and 4. The inner diameter of the nanotubes tends to increase due to the longer exposure to the etchant in the electrolyte. The backside view of the TiO2 films shows that the bowl-shaped bottom surface of the nanotube array (in FIGS. 5 and 6). The outer diameters of the nanotubes for both the purple and green films are estimated to be around 300 nm by measuring the diameters of the bowl-shaped ripples on the bottom surface of the film.

Figure 8:
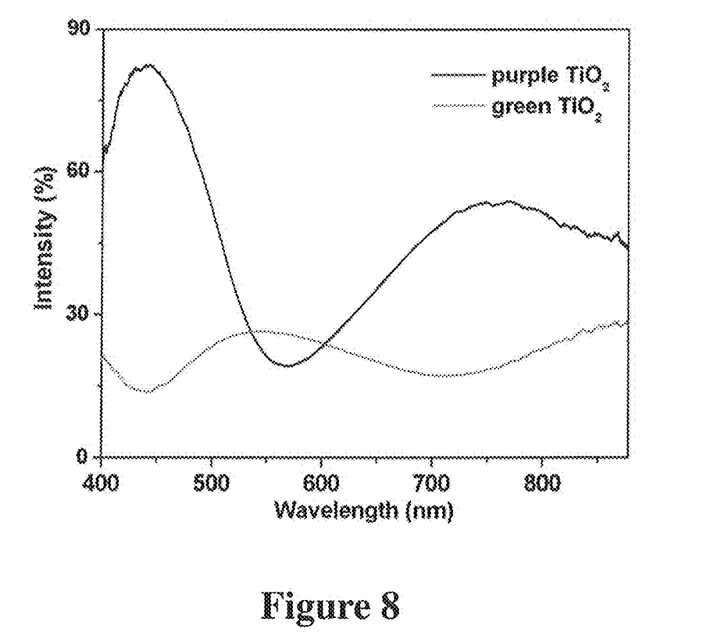
FIG. 8 is reflectivity spectra of the two fabricated photonic TiO2 films whose optical photographs are shown in FIGS. 3 and 5.

Reflectance spectra of the photonic TiO2 film are show in FIG. 8. The features within the visible wavelengths are consistent with the color of the TiO2 film, e.g., the reflectance peak at 560 nm corresponds to the green color. The color of the anodized TiO2 films originates from the Fabry-Pérot interference. The film thickness and its associated photonic color of the TiO2 films can be effectively tuned by adjusting the duration of the anodization process, e.g. the sinuous voltage waveform with 7 periods generates a purple film of 200 nm thick, and with 20 periods a green film of 400 nm thick. Referring again to FIG. 1, there are three Fabry-Pérot interference of the fabricated TiO2 film within a double layered structure. These are the interfaces between the air and the PTL layer, interface between the PTL and DTL layers and the interface between the DTL and Ti layers. These are denoted by as Interface I, Interface II and Interface III, respectively in FIG. 1. Thus, the fabricated TiO2 film is a double layered Fabry-Pérot structure with its reflectance features originating from the interference between light beams reflected from the 3 pairs of interfaces. According to the Bragg's Law, with normal incidence of light, the fringe maxima are described by the Fabry-Pérot relationship given in (1):

$$m\lambda = 2nd \quad (1)$$

where λ is the wavelength of each peak maximum, m is an integer, numbering the order of each successive peak, d is the distance between the two interfaces or the layer thickness, and n is the average refractive index of the film. Therefore, the wavelength of the reflectance peak maxima (λ) depends on the optical path difference of the light beams reflected from two interfaces (2nd). Therefore, for the reflectance peaks originated from the interference of light reflected from the I/II, II/III, and III/I (these reflectance peaks are denoted as Peaks-I/II, Peaks-II/III, and Peaks-III/I, respectively) their corresponding peak maximums, XIII, XII/III and XIII/I, respectively, are decided as follows:

$$m\lambda I/II = 2nPTLdPTL \quad (2)$$

$$m\lambda II/III = 2nDTLdDTL \quad (3)$$

$$m\lambda III/I = 2(nPTLdPTL + nDTLdDTL) = m\lambda I/II + m\lambda II/III \quad (4)$$

Here nPTL and nDTL are the effective refractive index of the PTL and the DTL, respectively. dPTL and dDTL are the layer thickness of PTL and DTL, respectively. For the visible wavelengths, nDTL=2.44. Because the pore dimensions in the fabricated films are too small to effectively scatter light, the PTL is treated as a single medium with a single refractive index value. Therefore, nPTL is calculated using (5) shown below.

$$nPTL = p + 2.44(1-p) \quad (5)$$

Here p is the porosity of the PTL.

With the total film thickness, i.e., the sum of dPTL and dDTL, and p estimated from the SEM study, and the value of nDTL fixed at 2.44 for the wavelength range studied in this work, one can attempt to examine the origin of the reflectivity features of the fabricated TiO2 films. Let us take the purple sample for example, whose reflectance spectrum is relatively simple (FIG. 6), where two reflectivity maximums at 750 nm and 440 nm were detected within the wavelength range from 400 nm to 890 nm. From the SEM study (e.g., FIGS. 2 and 4), p is estimated to be 10%, and the total film thickness is around 200 nm. Thus, the detected reflectivity peaks at 440 nm and 750 nm can only possibly be the 1st order peaks of Peaks-I/II, Peaks-II/III, or Peaks-III/I. A simple calculation using (2) (3) (4) and (5) can give all the possible origins of the observed reflectivity maximums at 440 nm and 750 nm, e.g., the 3 sets of possibilities shown in Table 1.

TABLE 1

Three sets of possible origins of the reflectivity maximums for the purple TiO2 film whose reflectivity spectrum is shown in FIG. 8.

| | Reflectivity maximum | Peak assignment | Peak order | Corresponding layer thickness |
|---|---|---|---|---|
| Possibility 1 | 440 nm | Peaks-I/II | 1st | dPTL = 96 nm |
| | 750 nm | Peaks-III/I | 1st | dPTL + dDTL = 160 nm |
| Possibility 2 | 440 nm | Peaks-II/III | 1st | dDTL = 90 nm |
| | 750 nm | Peaks-III/I | 1st | dPTL + dDTL = 158 nm |
| Possibility 3 | 440 nm | Peaks-I/II | 1st | dDTL = 96 nm |
| | 750 nm | Peaks-II/III | 1st | dDTL = 154 nm |

For each set of possibilities one can then check its accuracy by checking whether the peak maximums calculated using (2) (3) (4) and (5) match the measured spectrum. As an example, we here examine the accuracy of Possibilities 1 and 3 shown in Table 1 and the results are shown in Table 2.

TABLE 2

Comparison between the calculated peak maximums and the measured spectrum for Possibility 1 and Possibility 3 shown in Table 1.

| | Peak origin | Peak order | Calculated peak maximum | Is the calculated peak maximum consistent with the measured spectrum ? |
|---|---|---|---|---|
| Possibility 1 in table 1 | Peaks-I/II | 1st | 440 nm | Yes |
| | | 2nd | 220 nm | out of the spectrum range |
| | Peaks-II/III | 1st | 750 − 440 = 310 nm | out of the spectrum range |
| | Peaks-III/I | 1st | 750 nm | Yes |
| | | 2nd | 375 nm | out of the spectrum range |
| Possibility 3 in table 1 | Peaks-I/II | 1st | 440 nm | Yes |
| | | 2nd | 220 nm | out of the spectrum range |
| | Peaks-II/III | 1st | 750 nm | Yes |
| | | 2nd | 375 nm | out of the spectrum range |
| | Peaks-III/I | 1st | 440 + 750 = 1190 nm | out of the spectrum range |
| | | 2nd | 595 nm | The peak is not observed |
| | | 3rd | 397 nm | out of the spectrum range |

From Table 2, the measured spectrum agrees well with the calculation for Possibility 1, but not for Possibility 3. Therefore, Possibility 1 is valid, but Possibility 3 is not. Similarly, one can check the accuracy of all the other possibilities by comparing the calculation results with the spectral observation. Using this method, the only two valid assumptions are Possibility 1 and Possibility 2 shown in Table 1.

Figure 9:
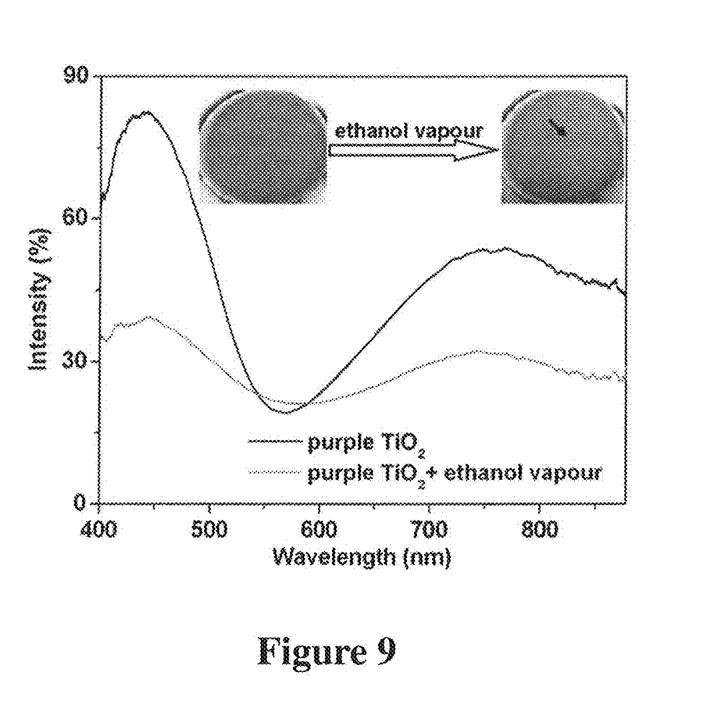
FIG. 9 is reflectivity spectra of the purple TiO2 film before and after exposed to ethanol vapor—the inset shows the optical photographs of the film before and after exposure to ethanol—the area exposed to ethanol vapor on the TiO2 film is indicated by a black arrow.

In (5) nPTL is calculated assuming the pores in the layer are filled with air. When the pores are filled with other substances, (5) is rewritten as follows:

$$nPTL = nsp + 2.44(1-p) \quad (6)$$

where ns is the refractive index of the foreign substance. According to (2) (3) and (4), when the porous TiO2 film is filled with foreign substances, nPTL increases, the Peaks-I/II and Peaks-III/I red-shift (Peaks-II/III do not shift because the DPL is non porous and nDTL does not change), and the spectral color change of the sample is resulted. Thus, similar to the other porous Fabry-Pérot films made from other materials, e.g., porous silicon, the photonic TiO2 films fabricated in this study may be used as optical sensors. However, interestingly, the expected red-shift of the reflectance features was not readily observed upon exposure to ethanol vapor (the refractive index of ethanol=1.36) for the fabricated samples. Instead, the intensity of the reflectivity features decreases as the sample is exposed to ethanol vapor. As an example, the spectrum of the above-discussed purple sample before and after exposure to ethanol vapor is shown in FIG. 9. From the analysis in the previous paragraphs, the reflectivity peaks observed in the spectrum of the purple sample can only be 1st order Peak-I/II, Peak-II/III or Peak-III/I. The absence of the red-shift of the reflectivity peaks is possibly because for the Peaks-II/III, their positions does not shift upon exposure to ethanol due to its nonporous structure, and even if for the Peaks-I/II and Peaks-II/III, the red-shift might be too small to be noticeable at the first place (according to (2) (4) and (6), even when all the pores of the PTL are filled completely with ethanol liquid, only a 1.6% increase of λI/II, or a red-shift of 7 nm for the reflectivity peak at 440 nm, is resulted, assuming the porosity of the PTL is 10%). The reason of the observed decrease of the intensity of the reflectivity features is possibly that the increase of the nPTL upon exposure to ethanol diminishes the difference in refractive index between the PTL and DTL, and thus reduces the intensity of light reflected from the Interface II, leading to the decrease of the intensity of the Peaks-I/II, Peaks-II/III. A simple calculation shows a 50% drop in reflectivity from the Interface II upon exposure to ethanol, when p equals to 10%.

Figure 7:
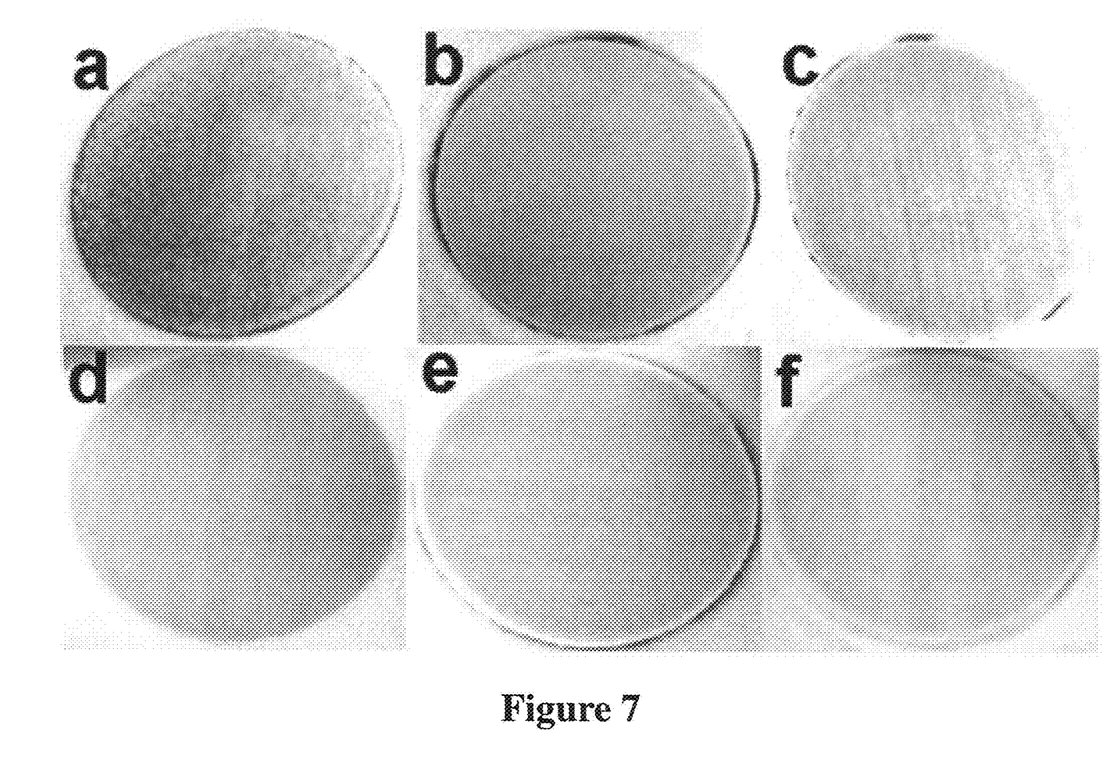

As mentioned above, colored TiO2 films can be fabricated using a number of other anodization profiles, including constant voltage, ramped voltage, pulsed voltage, and constant current. By adjusting the duration of the anodization process, TiO2 films of deferent thicknesses and photonic colors were obtained and are illustrated images a-f of FIG. 7. In FIG. 7 images a-c) show optical photographs of the photonic TiO2 films anodized by a constant voltage of 600 s, 900 s and 1200 s, respectively, d) shows an optical photographs of the photonic TiO2 film anodized by a ramped voltage profile, e) shows an optical photographs of the photonic TiO2 film anodized by a pulsed voltage waveform with 6 cycles, and f) shows an optical photographs of the photonic TiO2 film anodized by a constant current for 600 s. The TiO2 films fabricated using other anodization profiles also show the sensing capability by changing color upon exposure to ethanol.

Figure 10:
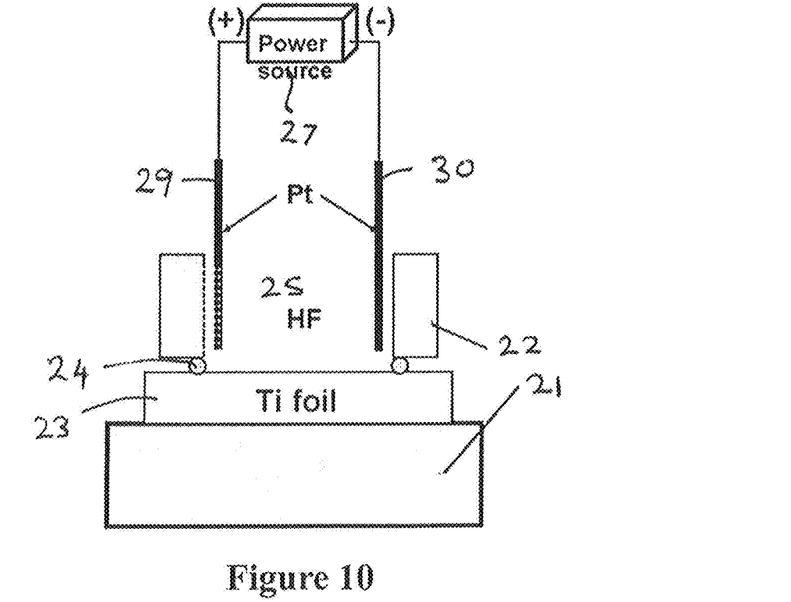
FIG. 10 is a section schematic illustration of a second embodiment of an apparatus for making a TiO2 film according to the invention.
Figure 11:
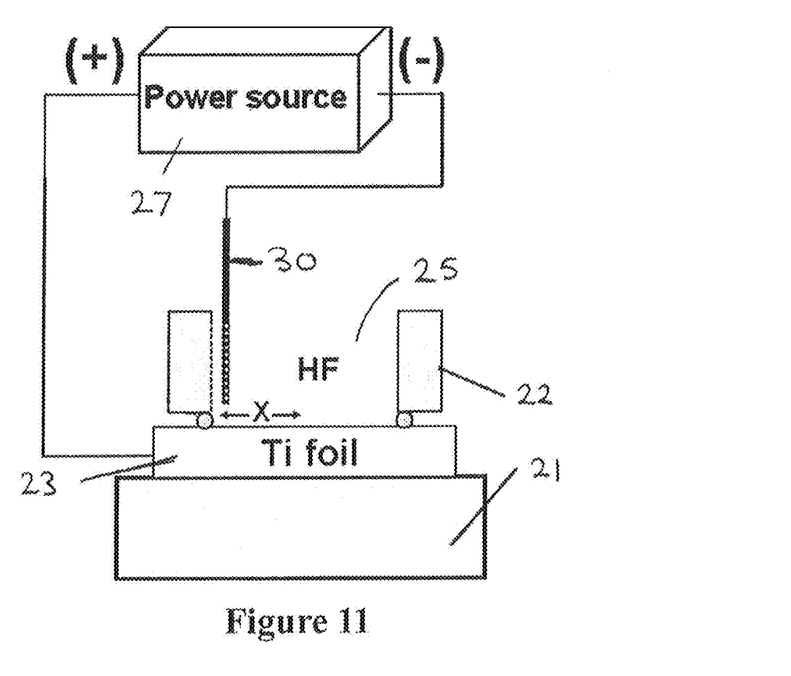
FIG. 11 is a section schematic illustration of a third embodiment of an apparatus for making a TiO2 film according to the invention.

The electrochemical etching setup illustrated in FIG. 2 generates a vertical electric field which results in uniform etching of the titanium foil. FIG. 10 illustrates a second possible arrangement of the etching setup in which two vertically extending electrode rods 29, 30 are disposed at diametrically opposed locations within the etching cell reservoir 25. This arrangement generates a parallel electric field. A yet further arrangement of the electrochemical etching setup is shown in FIG. 11 in which a single electrode rod 30 is used with the negative supply of the power source being again connected to the titanium foil. This arrangement results in a variation in the electric field density through the etching reservoir 25. Adjacent electrode 30 the electric field is strongest and gradually reduces in strength across the etching chamber to the furthest point from the electrode 30. This results in an electric field gradient in the "X" direction through the etching reservoir.

Figure 12:
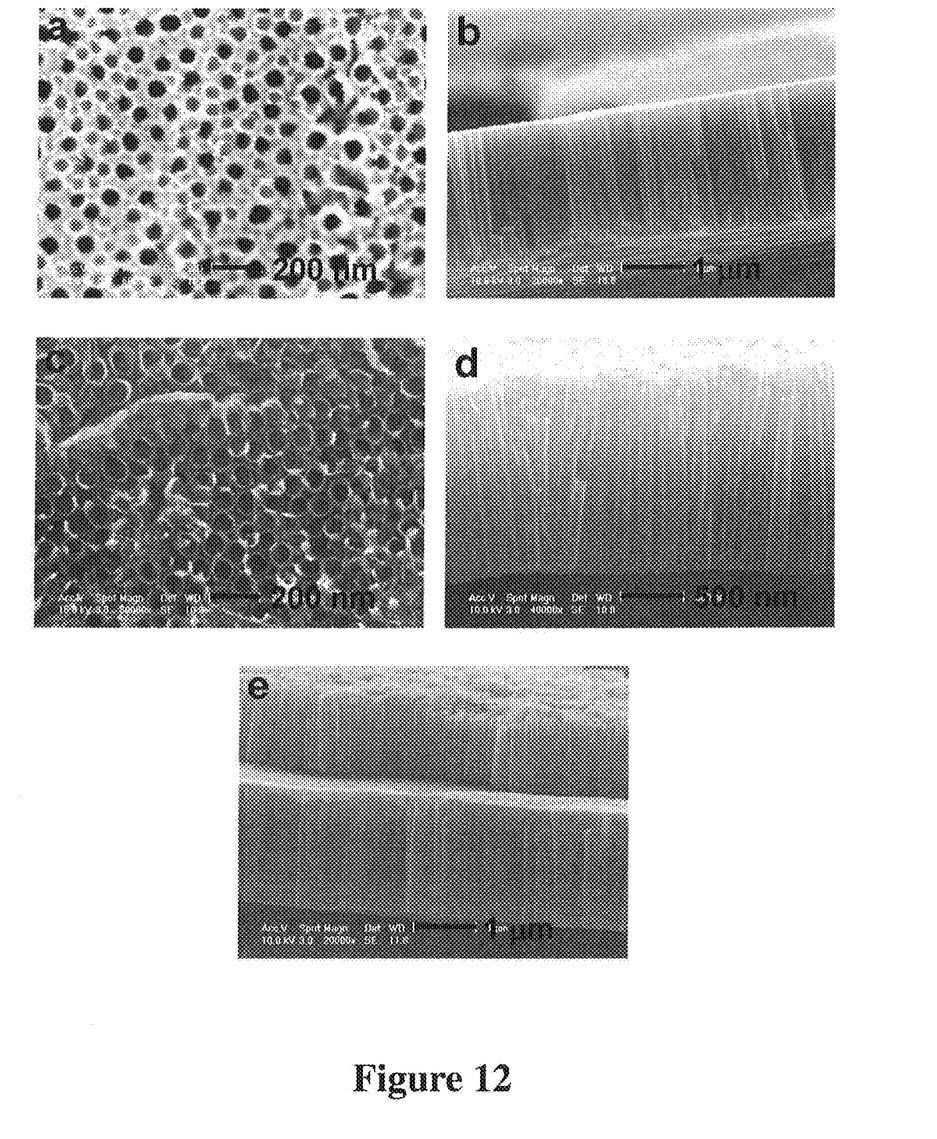
FIG. 12 shows SEM images of the tops (a and c) and sides (b, d and e) of a porous anodic TiO2 film according to a second embodiment of the invention.

In a further embodiment of the invention a double-layered TiO2 nanotube film can be fabricated in three steps. In a first step anodization is carried out with a vertical electric field using the apparatus of FIG. 2. Then in a second step the sample is etched with a parallel electric field using the setup of FIG. 10. In a third step the film is anodized again with a vertical electric field using the setup of FIG. 2. FIG. 12 shows SEM images of a film obtained after each fabrication step mentioned above. At each step a constant 6 mA etching current was used for 600 second. The electrolyte used consisted of an ethylene glycol solution with 0.21 M HF and 0.12 M H2O2. It can be seen in the images that the average outer and inner diameters of the fabricated TiO2 nanotubes were measured to be 180 nm and 60 nm after Step 1 (FIG. 12, a and b), and 110 nm and 60 nm after Step 2 (FIG. 12, c and d), indicating that the outer side of the tube walls were etched while the inner side remained intact. It is evident that a second layer of new nanotubes formed underneath the pre-grown nanotube layer after Step 3 (FIG. 12e). The average outer and inner diameters were measured to be 110 nm and 60 nm for the top layer and 170 nm and 60 nm for the bottom layer (FIG. 2e). It was noticed that the bottom nanotubes formed in Step 3 are similar to those formed in Step 1.

Figure 13:
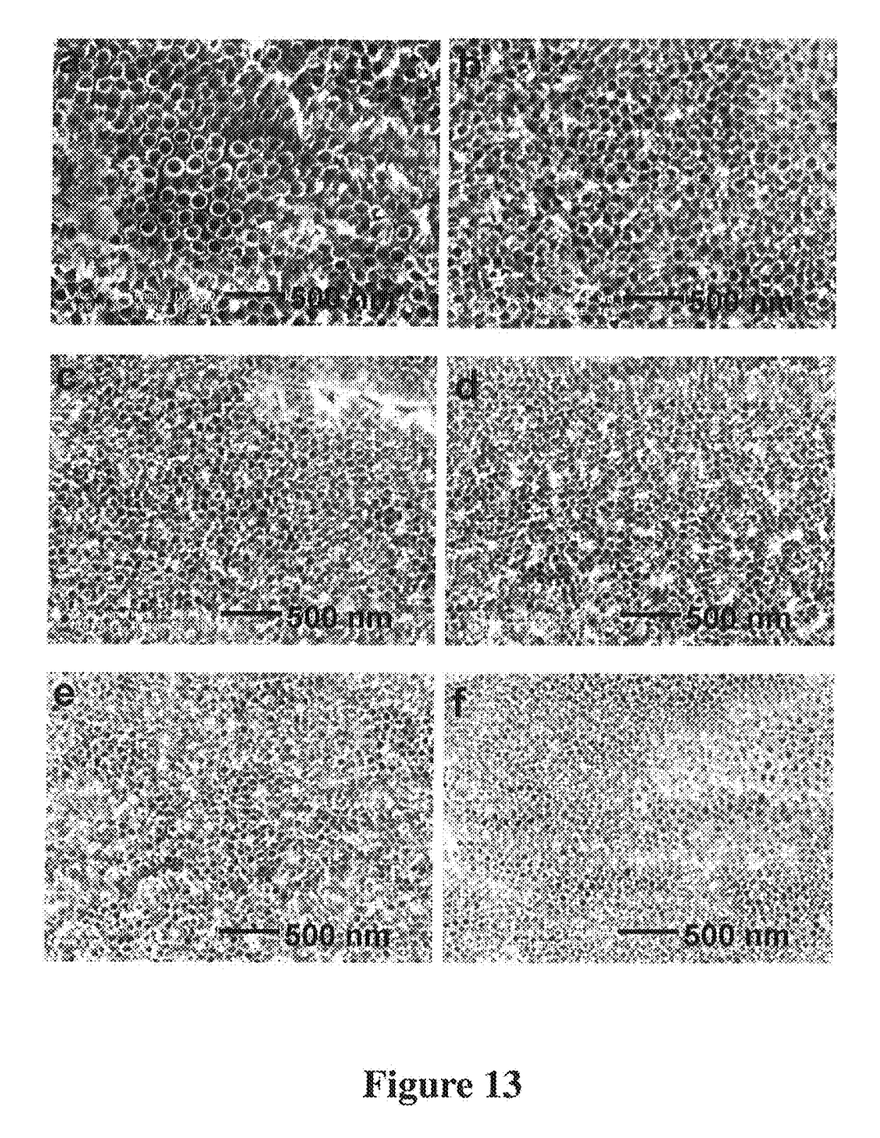
FIG. 13 shows SEM images of a gradient TiO2 film according to the third embodiment of the invention, at (a) x=0 mm, (b) x=2 mm, (c) x=4 mm, (d) x=6 mm, (e) x=8 mm, and (f) x=10 mm from the electrode.
Figure 14:
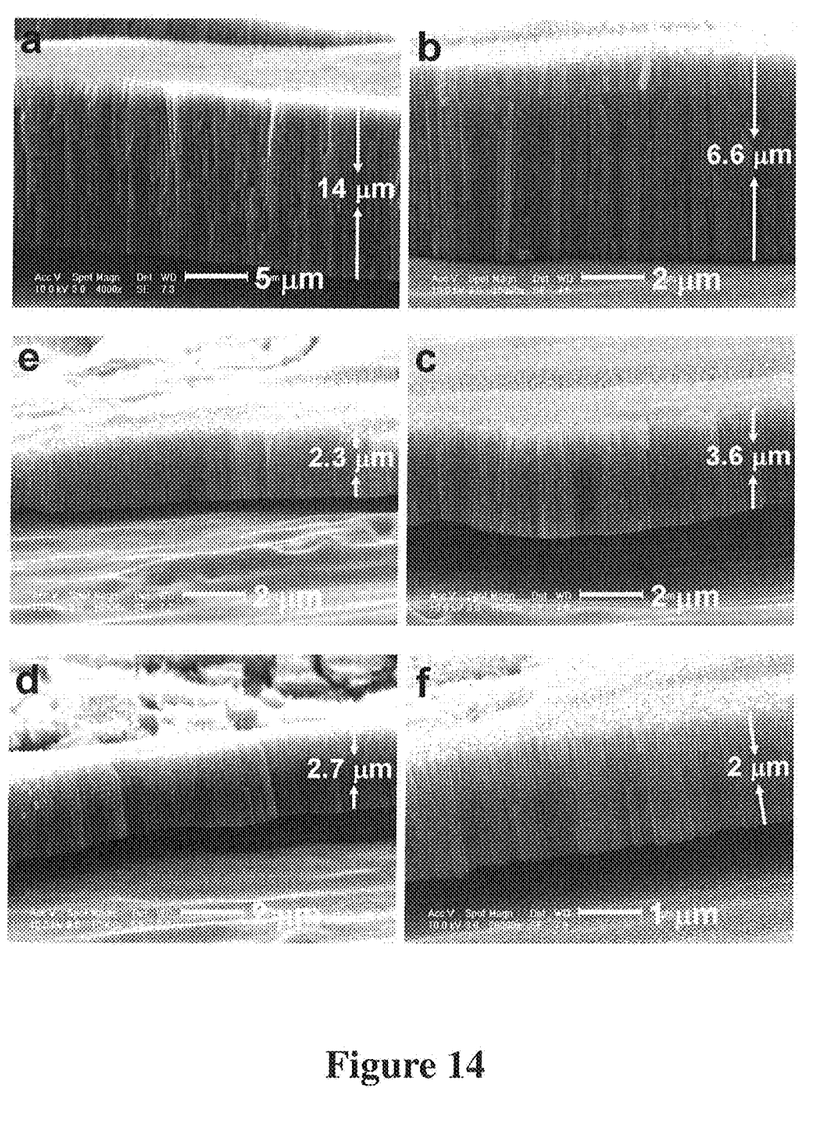
FIG. 14 shows respective side-view SEM images of the gradient TiO2 film of (a)-(f) of FIG. 13.
Figure 15:
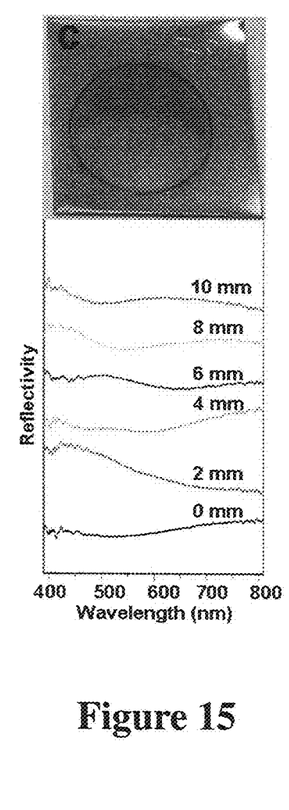
FIG. 15 is an optical photograph and reflectivity spectra of a gradient TiO2 film in air.
Figure 16:
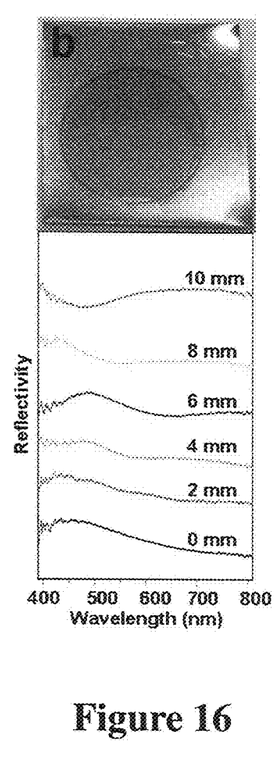
FIG. 16 is an optical photograph and reflectivity spectra of a gradient TiO2 film in ethanol vapor.
Figure 17:
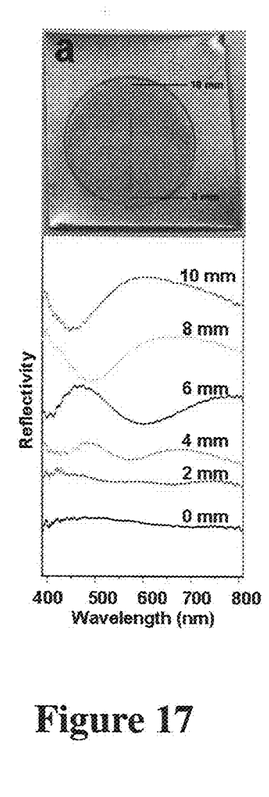
FIG. 17 is an optical photograph and reflectivity spectra of a gradient TiO2 film in hexane vapor.

FIGS. 13 and 14 illustrates a film made using a gradient electric filed with the setup of FIG. 11. It can be seen that as the value of x increases, i.e., the distance away from the Pt cathode 30 increases, the outer and inner diameters of the fabricated TiO2 nanotubes gradually changed from 160 to 70 nm and from 110 to 50 nm, respectively and the length of the fabricated TiO2 nanotubes decreased from 14 µm to 2 µm. FIGS. 15 through 17 show how the optical features of such a gradient TiO2 film changed upon exposure to ethanol and hexane vapor, suggesting the potential application of the gradient TiO2 films for optical sensing.

What is claimed is:

1. A method of making a porous titanium dioxide structure having a photonic color, the method comprising:
   providing a pair of electrodes in contact with an electrolyte solution;
   anodizing a titanium substrate in the electrolyte solution, by passing an electric current having a voltage or current profile through the electrolyte solution and the pair of electrodes in the presence of a first electric field, thereby forming a layer of dense titanium dioxide from the titanium substrate, wherein the first electric field is applied in a first field direction that is transverse to the titanium substrate;
   etching part of the layer of dense titanium dioxide in the electrolyte solution, by passing an electric current having the voltage or current profile through the electrolyte solution and the pair of electrodes, in the presence of a second electric field, thereby forming a layer of porous titanium dioxide within part of the layer of dense titanium dioxide and that includes pores extending to an outer surface of the layer of porous titanium dioxide, wherein the second electric field is applied in a second field direction that is parallel to the titanium substrate; and
   adjusting the voltage or current profile and duration of the voltage or current profile while anodizing the titanium substrate and while etching the layer of dense titanium dioxide, thereby controlling the photonic color of the porous titanium dioxide structure.

2. The method of claim 1 wherein the electrolyte solution is an organic electrolyte solution.

3. The method of claim 2 wherein the organic electrolyte solution includes an organic solvent.

4. The method of claim 1 wherein the electrolyte solution is a fluoride solution.

5. The method of claim 1, wherein the electric current has a profile selected from the group consisting of a periodic square profile, a periodic pulsed profile, a sine wave, a linear profile, and a quintic profile.

6. The method of claim 1 wherein the titanium substrate is one electrode of the pair of electrodes.

7. The method of claim 1 wherein anodizing and etching in the electrolyte solution in the presence of the first and second electric fields comprises varying electric field strengths.

8. The method of claim 1 further comprising, after the etching, removing the layer of porous titanium dioxide from the titanium substrate as a free standing porous titanium dioxide structure.

9. The method of claim 8 including removing the layer of porous titanium dioxide from the titanium substrate by one of mechanical force and electropolishing.

10. The method of claim 1 further comprising, after the etching, treating the layer of porous titanium dioxide to change chemical composition or structural features of the layer of porous titanium dioxide.

11. The method of claim 10, wherein treating the layer of porous titanium dioxide comprises chemically treating the layer of porous titanium dioxide.

12. The method of claim 11, wherein chemically treating the layer of porous titanium dioxide comprises partially or fully filling the pores in the layer of porous titanium dioxide with a compound selected from the group consisting of organic molecules, inorganic materials, and biomolecules.

13. The method of claim 11, wherein treating the layer of porous titanium dioxide comprises heating the layer of porous titanium dioxide to create a surface coating on the layer of porous titanium dioxide.

14. The method of claim 1, further comprising, after the etching of the layer of dense titanium dioxide in the electrolyte solution and forming the layer of porous titanium dioxide, anodizing the layer of porous titanium dioxide in the electrolyte solution in the presence of an electric field having the first field direction that is transverse to the titanium substrate.

15. A method of making a porous titanium dioxide structure having a photonic color, the method comprising:
applying a periodic voltage or current having a period across a titanium substrate, as a first electrode, in an electrolyte solution, and a second electrode in the electrolyte solution, in the presence of a first electric field, thereby anodizing the titanium substrate and forming a layer of dense titanium dioxide from the titanium substrate, wherein the first electric field is applied in a first field direction that is transverse to the titanium substrate;
applying a periodic voltage or current across the titanium substrate in the electrolyte solution and the second electrode, in the electrolyte solution, in the presence of a second electric field, thereby etching part of the layer of dense titanium dioxide in the electrolyte solution and forming a layer of porous titanium dioxide within part of the layer of dense titanium dioxide and that includes pores extending to an outer surface of the layer of porous titanium dioxide, wherein the second electric field is applied in a second field direction that is parallel to the titanium substrate; and
controlling profile of the periodic voltage or current and duration of application of the periodic voltage or current to the first and second electrodes, thereby controlling thickness of the layer of porous titanium dioxide and the photonic color of the porous titanium dioxide structure.

16. The method of claim 15, including controlling the duration of the application of the periodic voltage or current and thereby controlling the thickness and the photonic color of the layer of porous titanium dioxide by stopping application of the periodic voltage or current after a fixed number of periods of the application of the voltage or current across the first and second electrodes.

17. The method of claim 15, wherein the periodic voltage or current has a profile selected from the group consisting of a periodic square profile, a periodic pulsed profile, and a sine wave profile.

* * * * *